United States Patent [19]

Broekhuis

[11] Patent Number: 4,577,002
[45] Date of Patent: Mar. 18, 1986

[54] ELASTOMERIC COPOLYMERS, THEIR PREPARATION AND THEIR USE

[76] Inventor: Antonius A. Broekhuis, Badhuisweg 3, 1031 CM Amsterdam, Netherlands

[21] Appl. No.: 734,260

[22] Filed: May 15, 1985

Related U.S. Application Data

[63] Continuation of Ser. No. 617,029, Jun. 4, 1984, abandoned.

[30] Foreign Application Priority Data

Jun. 13, 1983 [GB] United Kingdom ............... 8316052

[51] Int. Cl.$^4$ ............................................. C08F 4/48
[52] U.S. Cl. ................................. 526/181; 525/314; 526/340
[58] Field of Search ........................................ 526/181

[56] References Cited

U.S. PATENT DOCUMENTS

| | | | |
|---|---|---|---|
| 3,402,159 | 9/1968 | Hsieh | 526/340 |
| 4,089,913 | 5/1978 | Miki | 525/314 |
| 4,367,325 | 1/1983 | Takeuchi | 526/181 |
| 4,396,743 | 8/1983 | Fujimaki | 525/314 |
| 4,397,994 | 8/1983 | Takeuchi | 526/181 |
| 4,433,109 | 2/1984 | Takeuchi | 525/314 |

FOREIGN PATENT DOCUMENTS

| | | |
|---|---|---|
| 0054911 | 6/1982 | European Pat. Off. . |
| 2071117 | 9/1981 | United Kingdom . |
| 2075524 | 11/1981 | United Kingdom . |

*Primary Examiner*—Paul R. Michl
*Attorney, Agent, or Firm*—Stevens, Davis, Miller & Mosher

[57] ABSTRACT

The invention relates to elastomeric copolymers of an aromatic vinyl compound and a conjugated diene, suitable for use in the tread portion of a pneumatic tire, which copolymers have a vinyl content of at least 30% by weight and comprise at least two polymer chains coupled to one another having a differential content of the aromatic vinyl compound at the ends of the copolymer which changes in a portion of not more than 5% of each polymer chain from a first value to a second value which is at least 25 percentage points higher than the first value, and said portion lies within the free terminal 10% portion of the copolymer chain (as determined by monomer conversion); their preparation and their use in tread portions of tires. The process of the invention is characterized by employing as structure modifier a compound of formula $$R^1-O-CH_2-CH_2-O-R^2 \qquad (I)$$

wherein $R^1$ and $R^2$ are the same or different $C_{2-18}$ alkyl groups, and on completion of polymerization, polymer chains are coupled by means of a coupling agent. The copolymers are characterized by containing a region extending over at least 50% of the polymer chain (as determined by monomer conversion) wherein the differential content of the aromatic vinyl compound in the polymer chain is at least 5% by weight less than the average content of the aromatic vinyl compound in the copolymer.

11 Claims, 2 Drawing Figures

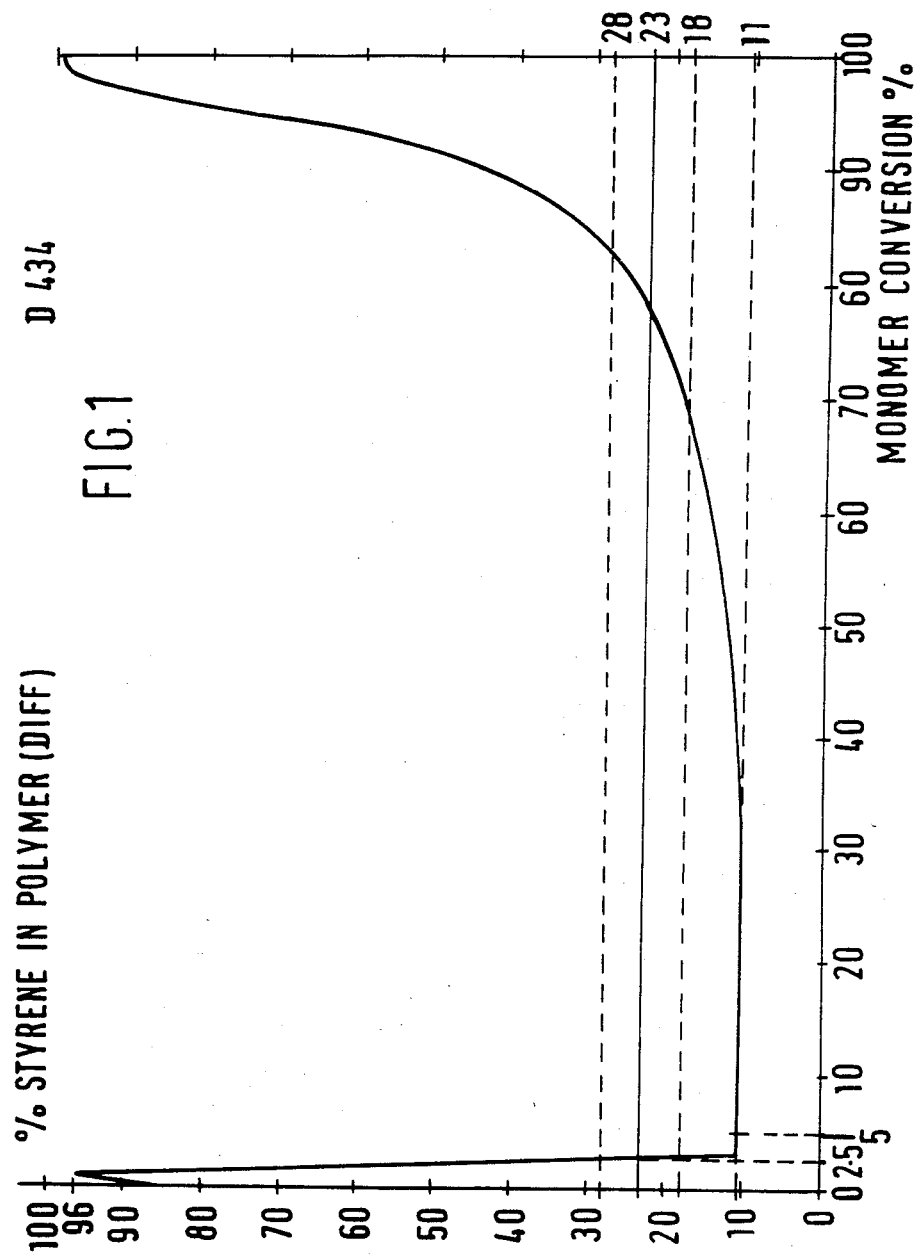

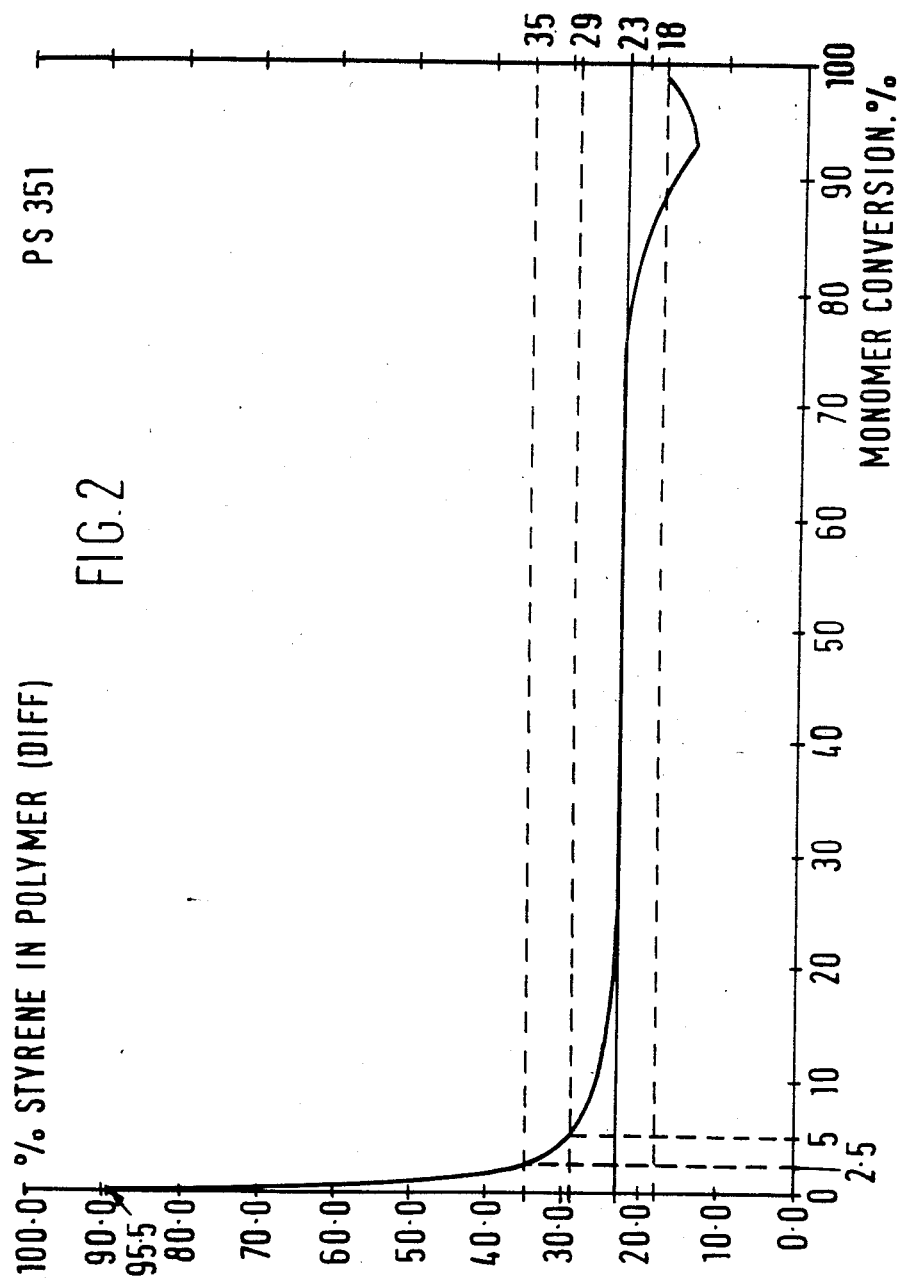

ELASTOMERIC COPOLYMERS, THEIR PREPARATION AND THEIR USE

This application is a continuation of application Ser. No. 617,029, filed June 4, 1984, now abandoned.

This invention relates to a process for preparing elastomeric copolymers of aromatic vinyl compounds and conjugated dienes, to such copolymers per se and to their use in elastomeric compositions especially for tread portions of tyres.

In UK Patent Application GB No. 2,071,117A, there are described elastomeric copolymers of aromatic vinyl compounds and conjugated dienes, suitable for use in the tread portion of pneumatic tyres, which copolymers have a vinyl content of at least 30% by weight and a differential content of the aromatic vinyl compound which changes in a portion of not more than 5% of the copolymer chain (as determined by monomer conversion) from a first value to a second value, said second value being at least 25 percentage points greater than said first value; and said portion lies within a terminal 10% portion of the copolymer chain (as determined by monomer conversion). The aromatic vinyl compound is conveniently styrene and the conjugated diene is conveniently isoprene or, preferably, butadiene.

The term "vinyl content" as used above and elsewhere in this specification refers to that portion by weight of the 1,3-butadiene or other diene component of a copolymer which has polymerised at the 1,2- or 3,4-positions. Where the diene is 1,3-butadiene the 1,2- or 3,4-polymerisation results in the formation of pendant vinyl groups; where the diene is other than 1,3-butadiene corresponding pendant groups are produced by 1,2- or 3,4-polymerisation.

The above elastomeric copolymers are conveniently prepared by subjecting a mixture of the aromatic vinyl compound and the conjugated diene to solution polymerisation conditions in the presence of an intiator, using means to ensure that an enhanced or increasing proportion of the aromatic vinyl compound is formed at an opening or closing stage of the copolymerisation reaction. The latter means conveniently comprises use of a structure modifier favouring 1,2- or 3,4-polymerisation of the conjugated diene at the expense of 1,4-polymerisation. Examples mentioned of such modifiers comprise:

(1) Ethers, thioethers, cyclic ethers, tertiary amines; for instance diethyl ether, dimethyl ether, tetrahydrofuran, dioxane, o-dimethoxybenzene, monoglyme, diglyme, triethylamine;
(2) Hexamethylphosphortriamide;
(3) Difunctional Lewis bases, for instance, tetramethylethylenediamine;
(4) Organic potassium or sodium compounds, for instance potassiumtert. butoxide.

However, in the specific examples of the preparation of elastomeric copolymers only o-dimethoxybenzene and diglyme are used.

The above copolymers may be in the form of composite molecules obtained by coupling together two or more smaller copolymer molecules.

UK Patent Application GB No. 2,075,524A and European Patent Application EP No. 54,911 A1 both described the preparation of random copolymers of styrene and butadiene having specified vinyl contents by processes using Lewis base structure modifiers. GB No. 2,075,524A mentions various ethers and tertiary amines, including ethyleneglycol dimethyl ether, ethyleneglycol diethyl ether, ethylene glycol dibutyl ether, diethyleneglycol dimethyl ether and other di- and triethyleneglycol ethers, as possible modifiers, although only diethyleneglycol dimethyl ether (diglyme) is used in the specific examples. EP No. 54,911 A1 mentions various ether compounds, thioether compounds, tertiary amine compounds, phosphine compounds, alcoholates of alkali metals (other than lithium), sulphonates and sulphuric esters, of which ethyleneglycol dibutyl ether, tetramethylene diamine and potassium nonylphenoxide are used in the specific examples and in comparative examples.

It has now been discovered that use of a specific class of glycol ethers as structure modifier in a process similar to processes described in GB No. 2,071,117A enables copolymers to be obtained which when incorporated into the tread portion of a tyre impart good rolling resistance and wet grip properties to the tyre together with surprisingly enhanced abrasion resistance.

According to the present invention therefore, there is provided a process for preparing an elastomeric copolymer of an aromatic vinyl compound and a conjugated diene, which copolymer has a vinyl content of at least 30% by weight and a differential content of the aromatic vinyl compound at the ends of the copolymer which changes in a portion of not more than 5% of the polymer chain from a first value to a second value which is at least 25 percentage points higher than the first value, and said portion lies within the initial 10% of the copolymer chain (as determined by monomer conversion), which process employs as structure modifier a compound of formula $$R^1\text{—}O\text{—}CH_2\text{—}CH_2\text{—}O\text{—}R^2 \qquad (I)$$

wherein $R^1$ and $R^2$ are the same or different $C_{2-18}$ alkyl groups, and on completion of polymerisation, polymer chains are coupled by means of a coupling agent.

In the case of $R^1$ and/or $R^2$ groups having more than 2 carbon atoms, the alkyl groups may be linear or branched. Preferably $R^1$ and $R^2$ are the same or different $C_{2-6}$ alkyl groups. More preferably $R^1$ and $R^2$ are the same or different $C_4$ alkyl groups, e.g. n-butyl, s-butyl, isobutyl or t-butyl groups. Conveniently $R^1$ is n-butyl and $R^2$ is n-butyl or t-butyl.

According to a second aspect of the invention there is provided an elastomeric copolymer of an aromatic vinyl compound and a conjugated diene, suitable for use in the tread portion of a pneumatic tyre, which copolymer has a vinyl content of at least 30% by weight and comprises at least two polymer chains coupled to one another having a differential content of the aromatic vinyl compound at the ends of the copolymer which changes in a portion of not more than 5% of each polymer chain (as determined by monomer conversion) from a first value to a second value which is at least 25 percentage points higher than the first value, and said portion lies within the free terminal 10% portion of the copolymer chain (as determined by monomer conversion), wherein each polymer chain contains a region extending over at least 50% of the polymer chain (as determined by monomer conversion) wherein the differential content of the aromatic vinyl compound in the polymer chain is at least 5% by weight less than the average content of the aromatic vinyl compound in the copolymer. Copolymers according to the second aspect of the invention are preparable by the process of the invention.

Copolymers of particular interest are those in which the differential content of the aromatic vinyl compound changes in a zone of not more than 2.5% of each copolymer chain (as determined by monomer conversion) from a first value to a second value, said second value being at least 14 percentage points greater than said first value; and said zone lines within the free terminal 10% portion of the copolymer chain (as determined by monomer conversion). The 5% and 2.5% portion or zone referred to above is advantageously the free terminal 5% portion or 2.5% zone of the copolymer chain (i.e. in the process of the invention the initial 5% of the copolymer chain).

The change of differential content from the first value to the second value in the zone of not more than 2.5% of each copolymer chain may occur over a very small portion of the copolymer chain, for example 0.5%, 1.5% or 2% of the chain (as determined by monomer conversion).

The vinyl aromatic compound may conveniently by styrene or another monovinyl aromatic compound, such as 1-vinylnaphthalene, 3,5-diethylstyrene, 4-n-propylstyrene, 2,4,6-trimethylstyrene, 4-phenylstyrene, 4-p-tolylstyrene, 3,5-diphenylstyrene, 3-ethyl-1-vinylnaphthalene or 8-phenyl-1-vinylnapthalene.

Where, for example, branching or cross-linking is desired a polyfunctional vinyl compound can be used. For example, suitable polyfunctional vinyl compounds are divinyl compounds, for instance divinylbenzene. Styrene is the preferred aromatic vinyl compound.

The conjugated diene is one capable of polymerisation with styrene at the 1,2 positions and such that, when polymerised with styrene or other selected aromatic vinyl compound or compounds, it provides a polymer having desired elastomeric properties. The diene can, for example, be a butadiene or pentadiene, for example: 1,3-butadiene, 2-methyl-1,3-butadiene (isoprene), 1,3-pentadienes (piperylene), 2,3-dimethyl-1,3-butadiene, 2 methyl-1,3-pentadiene, 2,3-dimethyl-1,3-pentadiene, 2-phenyl-1,3-butadiene or 1-phenyl-1,3-butadiene. Isoprene and, especially, 1,3-butadiene are the preferred conjugated dienes.

The aromatic vinyl compound is preferably present in the copolymer in an amount in the range 10% to 40% by weight, preferably 15% to 35%, more preferably 20% to 25% by weight. Amounts in the range 20% to 25% by weight, e.g. substantially 23% by weight, are particularly preferred. Mixtures of aromatic vinyl compounds and/or mixtures of dienes may be used if desired.

The region of the polymer chain wherein the differential content of the aromatic vinyl compound in the polymer chain is at least 5% by weight less than the average content of the aromatic vinyl compound in the copolymer preferably extends over 50% to 70%, advantageously 60% to 70%, of the polymer chain (as determined by monomer conversion).

The copolymer has a vinyl content of at least 30% by weight, and preferably the vinyl content is in the range 30% to 60% by weight. Such vinyl contents are achieved in the process of the invention by employing the structure modifier of formula I.

Elastomeric copolymers of the invention having very good properties have been found to have glass transition temperatures (Tg) below $-45°$ C., e.g., below $-50°$ C.

Solution polymerisation in processes in accordance with the invention may be initiated by a suitable initiator such as a lithium-hydrocarbon compound, e.g. methyl lithium, ethyl lithium, n-propyl lithium, isopropyl lithium, n-butyl lithium, s-butyl lithium, t-butyl lithium, n-amyl lithium, isoamyl lithium, n-hexyl lithium, n-octyl lithium, or phenyl lithium. Very good results have been obtained by using s-butyl lithium.

Suitable solvents (which can be two-or other multicomponent solvents) for the reaction are, for example, alkanes, alkenes, cycloalkanes and cycloalkenes, such as benzene, toluene, xylenes, ethylbenzene, isobutane, n-pentane, isopentane, n-heptane, iso-octane, n-decane, cyclopentane, methylcyclopentane, dimethylcyclopentane, cylohexane, methylcyclohexane, dimethylcyclohexane, 1-butene, 2-butene, 1-pentene, 2-pentene and cyclopentene. Cyclohexane has been found to be a very suitable solvent.

The process of the invention may if desired be effected by introduction of monomers in continuous, semi-continuous or stepwise manner into a reactor. The relative proportions of aromatic vinyl compound and conjugated diene in portions or streams of monomers added during the process may vary during the course of polymerisation. Advantageously the relative proportion of the aromatic vinyl compound in the monomer blend is higher than the average amount of aromatic vinyl compound in the eventual copolymer, at the start of polymerisation.

Suitable temperatures for the reaction are, for example, in the range from $20°$ to $70°$ or $80°$ C. Care has to be taken in using the higher temperatures to speed up the conversion rate because higher temperatures favour 1,4-polymerisation and reaction temperature should be monitored in order to avoid a reduction in vinyl content below 30%.

Coupling of the polymer chains may be achieved using a difunctional coupling agent, such as dibromoethane, leading to a linear coupled copolymer, or a tri- or other polyfunctional coupling agent, for example the tetrafunctional compounds silicon tetrachloride ($SiCl_4$), diethyl adipate (DEAP), dimethyl adipate or stannic chloride ($SnCl_4$), providing a non-linear or branched coupled copolymer. It is preferred for the coupling agent to be a tetrafunctional coupling agent. DEAP has been found to be very satisfactory.

The invention further provides an unvulcanised elastomeric composition comprising a blend of an elastomeric copolymer of the invention with vulcanization compounding ingredients and tyres whose tread has been formed by vulcanising such an elastomeric composition.

The invention will be further understood from the following examples, in association with the accompanying drawings in which:

FIG. 1 is a graph print showing variation of percentage differential styrene content of the polymer against total monomer conversion in the process of Example 1, and FIG. 2 is a graph print showing variation of percentage differential styrene content of the polymer against total monomer conversion in the process of Comparative Example A.

EXAMPLE 1

A 10 l stainless steel reactor was charged with 4000 g of cyclohexane, 23 g of styrene, 1 g of 1,3-butadiene and 1.625 g of ethyleneglycol di-n-butyl ether (EDIB). The contents were brought to a temperature of 65° C. Next the impurities in the solvent/monomer blend which were capable of reacting with s-butyl lithium were deactivated by titration with a solution of s-butyl lithium in cyclohexane (concentration 100 mmol/l). After a temperature rise of 0.1° C. was observed, indicating that all impurities capable of interfering with the polymerisation reaction had been deactivated, a solution of s-butyl lithium in cyclohexane (66.7 ml of concentration 100 mmol/l) was added to initite polymerisation.

8 min after addition of the s-butyl lithium solution, a blend of 207 g of styrene and 769 g of 1,3-butadiene was added gradually over 5 min.

The temperature of the reactor contents was maintained at 65° C. by cooling, while polymerisation continued for a further 90 min, by which time monomer conversion exceeded 99.9%.

The polymer chains were coupled to yield a polymer of branched structure by addition of 0.33 g of DEAP. Further polymerisation was inhibited thereafter by addition of 0.5 g of methanol, and finally 0.5 g of 2,6-di-t-butyl-p-cresol were added as stabiliser.

The resulting polymer was recovered from the reaction solution by steam coagulation.

Comparative Example A (in accordance with UK Patent Application Specification No. 2,071,117) (compare Example 16 B thereof).

A 10 l stainless steel reactor was charged with 4000 g of cyclohexane, 23 g of styrene, 2.3 g of 1,3-butadiene and 2,25 g of o-dimethoxybenzene (ODMB). The contents were brought to a temperature of 55° C. Next the impurities in the solvent/monomer blend which were capable of reacting with s-butyl lithium were deactivated by titration with a solution of s-butyl lithium in cyclohexane (concentration 100 mmol/l). After a temperature rise of 0.1° C. was observed, indicating that all impurities capable of interfering with the polymerisation reaction had been deactivated, a solution of s-butyl lithium in cyclohexane (66.7 ml of concentration 100 mmol/l) was added to initiate polymerisation.

1 min after addition of the s-butyl lithium solution, a blend of 207 g of styrene and 690.7 g of 1,3-butadiene was added gradually over 60 min, followed by addition of 77 g of 1,3-butadiene over a further 20 min. Polymerisation was continued for a further 60 min, the temperature of the reactor contents being maintained at 60° C. by cooling, by which time monomer conversion exceeded 99.9%.

The polymer chains were coupled to yield a polymer of branched structure by addition of 0.33 g of DEAP. Further polymerisation was inhibited thereafter by addition of 0.5 g of methanol, and finally 0.5 g of 2,6-di-t-butyl-p-cresol were added as stabiliser.

The resulting polymer was recovered from the reaction solution by steam coagulation.

FIGS. 1 and 2 of the drawings illustrate variation of percentage differential styrene content of the polymer against total monomer conversion in the processes of Example 1 and Comparative Example A respectively. The differential styrene content at various stages of monomer conversion were calculated from the copolymerisation kinetics of styrene and butadiene using the following equation:

$$\frac{S1}{B1} = \frac{S}{B} \cdot \frac{R1S + B}{R2B + S}$$

wherein

S1 = weight fraction of styrene in copolymer
B1 = weight fraction of butadiene in copolymer
S = weight fraction of styrene in monomer blend,
B = weight fraction of butadiene in monomer blend,
R1 = reactivity ratio of styrene, and
R2 = reactivity ratio of butadiene.

The styrene and butadiene weight fractions in the copolymer in relation to their weight fractions in the monomer blend were determined by polymerising styrene and butadiene feeds of varying composition to conversions of less than 5% and measuring the styrene and butadiene contents of the resulting copolymers by infra-red spectroscopy.

From these results R1 and R2 were calculated by the method of Fineman and Ross, J. Polymer Science, 5, (1950) page 259, and as described in UK Patent Application GB No. 2,071,117A.

In the drawings total monomer conversion is referred to, for the sake of convenience, as "monomer conversion", percentage differential styrene content is referred to as "% styrene in polymer (diff)", and the solid horizontal line (at 23%) represents the average styrene content (%) of the polymer.

Referring to FIG. 1, it will be seen that the differential styrene content of the copolymer of Example 1 changes over that portion of monomer conversion between 0% and 5% conversion from a first (threshold) value (T) of 11% to a second (maximum) value (M) of 96% (at 1T monomer conversion), i.e. change (M-T) of 85 percentage points; and that over the terminal 2.5% zone of the 5% portion the differential styrene content changes from a first (threshold) value (T') of 28% to the second (maximum) value (M) of 96% (at 1%), i.e. a change (M-T') of 68 percentage points.

Furthermore, it will be seen that a region exists extending from 3% monomer conversion to 69% monomer conversion, i.e. over 66% of the polymer chain, wherein the styrene content of the polymer chain is as least 5% less than the average styrene content of the copolymer.

In FIG. 2 it is seen that the differential styrene content of the copolymer of Comparative Example A changes over that portion of monomer conversion between 0% and 5% conversion from T of 29% to M of 89.5% (at 0% monomer conversion), i.e. a change (M-T) of 60.5 percentage points, and that the terminal 2.5% zone of the 5% portion the differential styrene content changes from T' of 35% to M of 89.5%, i.e. a change (M-T') of 54.5 percentage points.

However, it will also be seen that a region exists extending only from 88% monomer conversion to 98.5% monomer conversion, i.e. 10.5% of the polymer chain, wherein the styrene content is at least 5% less than the average styrene content of the copolymer.

Other characteristics of the copolymers of Example 1 and Comparative Example A are given in Table I following.

TABLE I

| Example | Styrene content % (average) | Vinyl content % | Mol wt × 10⁻³ BC | Mol wt × 10⁻³ AC | Tg °C. |
|---|---|---|---|---|---|
| 1 | 23.0 | 53 | 190 | 550 | −51 |
| Comparative A | 23.0 | 49 | 200 | 620 | −43 |

"Vinyl content" is the percentage of the butadiene component of the polymer which has polymerised at the 1,2-positions.

"Mol wt" is the weight average molecular weight and is the apparent peak molecular weight measured by gel permeation chromatography using polystyrene as calibrant. "BC" refers to before coupling and "AC" to after coupling, "Tg" is the glass transition temperature in °C.

Each of the copolymers has been formulated in an elastomer composition having in each case the following constitution.

|  | parts by weight |
| --- | --- |
| copolymer | 100 |
| sulphur | 1.75 |
| accelerator - CBS (cyclohexylbenzthiazyl sulphenamide) | 1 |
| carbon black N 375 | 50 |
| antioxidant BLE 75 | 2 |
| zinc oxide | 3 |
| stearic acid | 1 |

The elastomeric compositions were vulcanised at 140° C. for 60 min in a steam autoclave, using a 15 min rise to temperature.

The elastomeric compositions have been tested to assess their wet grip properties on a road surface. Each of those compositions was used as the tread compound of model tyres of size 2.25-8 (dimensions in inches) (5.7 cm × 20.3 cm). These model tyres were subjected to the following tests to determine wet grip, rolling resistance and abrasion index.

Grip on a Delugrip road surface (Delugrip is a Registered Trade Mark) was measured using the variable speed internal drum machine (VSIDM) described in a paper by G. Lees and A. R. Williams in Journal of the Institute of the Rubber Industry, 8, No. 3, June 1974. Measurements of the wet grip were made for locked wheel sliding friction.

Rolling resistance was measured on the rotary power loss machine described in Transactions of the Institute of the Rubber Industry, 34, No. 5, October 1958, applying Equation 3.1 which, as applied to SP4 steel radial tyres of Dunlop Limited, is as follows: rolling resistance $= 0.75 E'' + 0.83 (E''/(E^*)^2) + 66$, in which $E''$ and $E^*$ mean the loss modulus expressed in MPa and the complex modulus expressed in MPa, respectively, whilst the factor $(E''/(E^*)^2)$ is expressed in $GN/m^2$.

Abrasion resistance was determined according to Deutsche Industrie Normen (DIN) 53516.

Results are given in Table II.

TABLE II

| Copolymer | Wet Grip | Rolling resistance | Abrasion Index (DIN) |
| --- | --- | --- | --- |
| Example 1 | 105 | 97 | 78 |
| Comparative Example A | 105 | 98 | 67 |

It will be observed that although the tyres tested containing the copolymers of Example 1 and of Comparative Example A both exhibit good combinations of wet grip and rolling resistance, the tyres containing the copolymer of Example 1 exhibit significantly superior abrasion resistance in comparison with the tyres containing the copolymer of Comparative Example A.

I claim:

1. A process for preparing an elastomeric copolymer of an aromatic vinyl compound and a conjugated diene in the presence of an organolithium initiator characterized in that the process employs etheylene glycol n-butyl tert-butyl ether as a structural modifier to produce a copolymer which has a vinyl content of at least 30% by weight and a differential content of the aromatic vinyl compound at the ends of the copolymer which changes in a portion of not more than 5% of the polymer chain (as determined by monomer conversion) from a first value to a second value which is at least 25% points higher than the first value, and said portion lies with the initial 10% of the copolymer chain (as determined by monomer conversion) and on completion of polymerization, polymer chains are coupled by means of a coupling agent.

2. A process according to claim 1, wherein the coupling agent is a tetrafunctional coupling agent.

3. A process according to claim 1, wherein said 5% portion is the initial 5% of the copolymer chain.

4. A process according to claim 1, wherein the bound styrene content of the copolymer is in the range 10 to 40% by weight.

5. A process according to claim 1, wherein the vinyl content is in the range 30 to 60% by weight.

6. A process according to claim 2, wherein said 5% portion is the initial 5% of the copolymer chain.

7. A process according to claim 2, wherein the bound styrene content of the copolymer is in the range 10 to 40% by weight.

8. A process according to claim 3, wherein the bound styrene content of the copolymer is in the range 10 to 40% by weight.

9. A process according to claim 2, wherein the vinyl content is in the range 30 to 60% by weight.

10. A process according to claim 3, wherein the vinyl content is in the range 30 to 60% by weight.

11. A process according to claim 4, wherein the vinyl content is in the range 30 to 60% by weight.

* * * * *